(No Model.)
W. T. MORGAN.
CARPET STRETCHER.
No. 356,417. Patented Jan. 18, 1887.
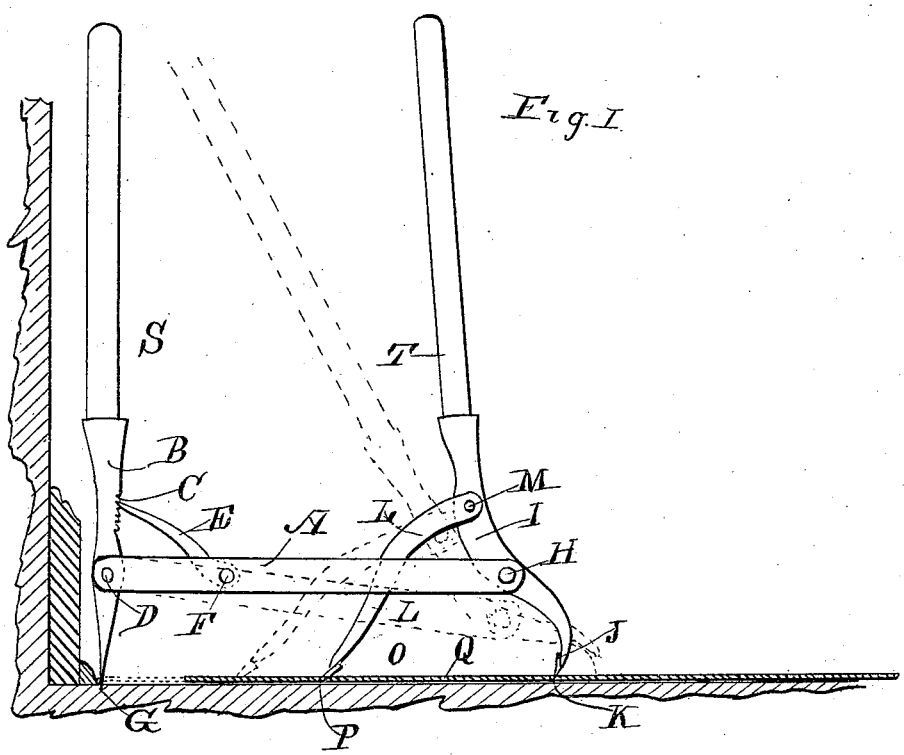
Fig. I.
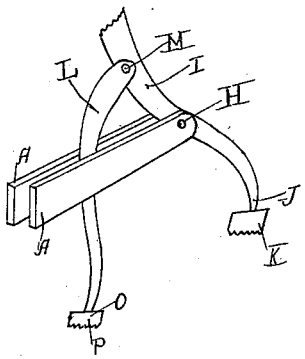
Fig. II.
Witnesses:
F. B. Polk
B. F. Schaeffer
William T. Morgan,
Inventor.
By Chas. E. Adamson
Atty.
N. PETERS, Photo-Lithographer, Washington, D. C.

UNITED STATES PATENT OFFICE.

WILLIAM T. MORGAN, OF MUNCIE, INDIANA.

CARPET-STRETCHER.

SPECIFICATION forming part of Letters Patent No. 356,417, dated January 18, 1887.

Application filed March 31, 1886. Serial No. 197,235. (No model.)

*To all whom it may concern:*

Be it known that I, WILLIAM T. MORGAN, a citizen of the United States, residing at Muncie, in the county of Delaware and State of Indiana, have invented a new and useful Improvement in Carpet-Stretchers, of which the following is a description, reference being had to the accompanying drawings, which form a part of this specification.

My invention relates to improvements in carpet-stretchers; and the objects of my improvements are to construct a cheap, practical, and durable carpet-stretcher and one that will be easy to operate. I attain these objects by the mechanism illustrated by the accompanying drawings—

Figure 1 of which represents a side elevation of my invention in use and in the act of drawing forward on the carpet, and Fig. 2 is a perspective view showing the bars A and the tooth-bars O and J.

Two bars, A, are placed parallel with each other and about half an inch apart, having the pointed socket B riveted between them at the forward end, all as shown. The socket B has notches C on one side, pointed on the lower end, and a handle, S, attached to the upper end, all as shown. A few inches back of the socket B a pawl, E, is secured between the said bars A by a rivet, F, so that the said pawl may be thrown forward in the notches to hold the handle S in a perpendicular position, all as shown.

Between the rear ends of the bars A is pivoted the socket I, which is provided with a flat bar, J, secured to the lower end, the said bar having short teeth K in its lower side to catch into the carpet, and the upper end of the said socket is provided with a handle, T, similar to the handle S, all as shown. Above the rivet H (which secures the said socket I between the bars A) is pivoted a curved arm, L, by the rivet M, the said arm curving forward and downward and having a bar, O, with teeth P, secured to the lower end, all as shown.

The operation of my invention is as follows: The pointed end of the handle S is secured in the floor close to the wall or base-board, as shown, the lower end or point, G, penetrating the floor against the base-board, while the handle S is on an incline, then the said handle is drawn up against the wall and the pawl E dropped in the notches back of it to hold the lever in a perpendicular position, as shown in the drawings. The toothed plates O and J are set upon the carpet Q, with the lever in a perpendicular position, and by pressing the lever forward, as indicated by the dotted lines, the front arm, L, pushes the carpet toward the wall while the lower end of the bar I moves backward, and if the forward motion is not sufficient to stretch the carpet the amount desired the lever is moved back, or away from the wall, which pulls forward on the toothed bar J and backward on the bar O, thereby stretching the carpet at each movement of the said lever T. It will therefore be seen that the lever T will stand at any angle when the carpet is pulling on it, and when the carpet is stretched the desired amount the stretcher will stand alone and allow the operator to secure the carpet to the floor. The bars O and J are made about five inches long, with teeth P and K just long enough to pass through the carpet.

Having thus described my invention, I claim the following and desire to secure the same by Letters Patent—

1. The combination, with the sockets, of the bars connecting them, one of said sockets having teeth, a pawl between the bars and adapted to engage the teeth, and an arm, L, pivoted between the bars and adapted to engage the carpet, substantially as described.

2. In a carpet-stretcher, the bars A A, lever-sockets B C, secured to the ends of the bars A, the pawl E, lever-socket I, arm L, and the toothed bars O and J, secured to the lower ends of parts I and L, substantially as described.

WILLIAM T. MORGAN.

Witnesses:
N. T. LEAGER,
C. E. ADAMSON.